(12) United States Patent
Shmagranoff et al.

(10) Patent No.: US 10,207,548 B2
(45) Date of Patent: Feb. 19, 2019

(54) SIDEWALL COOLING FINS

(71) Applicant: Bridgestone Americas Tire Operations, LLC, Nashville, TN (US)

(72) Inventors: Aleksandr Ian Shmagranoff, Akron, OH (US); Kevin E. Scheifele, Atwater, OH (US); Stephen Thomas Miranda, Copley, OH (US); Todd Alan Buxton, Norton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 318 days.

(21) Appl. No.: 14/682,753

(22) Filed: Apr. 9, 2015

(65) Prior Publication Data

US 2015/0290983 A1   Oct. 15, 2015

Related U.S. Application Data

(60) Provisional application No. 61/978,950, filed on Apr. 13, 2014.

(51) Int. Cl.
*B60C 13/02* (2006.01)
*B60C 23/18* (2006.01)
(Continued)

(52) U.S. Cl.
CPC .......... *B60C 13/02* (2013.01); *B29D 30/0061* (2013.01); *B29D 30/72* (2013.01); *B60C 23/18* (2013.01); *B29D 2030/728* (2013.01)

(58) Field of Classification Search
CPC ............... B29D 30/0061; B29D 30/72; B29D 2030/726; B29D 2030/728; B29D 2030/0612; B60C 23/18; B60C 23/00; B60C 13/00; B60C 13/02; B60C 23/19; B60C 13/023; B60C 15/00; B60C 15/0036; B60C 9/18; B60B 19/10
(Continued)

(56) References Cited

U.S. PATENT DOCUMENTS 5,303,758 A * 4/1994 Clementz .............. B60C 13/001
                                                           152/523
5,645,660 A * 7/1997 Attinello ................. B60C 13/02
                                                           152/523
(Continued)

FOREIGN PATENT DOCUMENTS

EP          0232242 A2 *  8/1987  ............... B60C 9/18
JP          953010          5/1996
(Continued)

OTHER PUBLICATIONS

Fred Stern, Chapter 7: Boundary Layer Theory, 2010, pp. 1-4.*
(Continued)

*Primary Examiner* — Robert C Dye
*Assistant Examiner* — Sedef E Paquette

(57) ABSTRACT

A tire has at least one band of cooling fins located on a sidewall portion of the tire. The band of cooling fins has at least one protruding cooling fin and at least one recess located adjacent to the cooling fin. At least a portion of the recess is recessed axially inwards relative to the cooling fin. The cooling fin has a height equal to or greater than an airflow boundary layer thickness at a predetermined location and angular velocity of the tire.

12 Claims, 6 Drawing Sheets

(51) Int. Cl.
*B29D 30/00* (2006.01)
*B29D 30/72* (2006.01)

(58) Field of Classification Search
USPC ........................................................ 152/523
See application file for complete search history.

(56) References Cited

U.S. PATENT DOCUMENTS

| | | | |
|---|---|---|---|
| 6,308,758 | B1 | 10/2001 | Cetin et al. |
| 6,418,993 | B1 | 7/2002 | Sakamoto et al. |
| 6,845,796 | B2 | 1/2005 | Katoh et al. |
| 6,983,911 | B1 | 1/2006 | Nordquist |
| 7,347,240 | B2 | 3/2008 | Tanaka |
| 8,522,844 | B2 | 9/2013 | Yamaguchi |
| 9,016,340 | B2 | 4/2015 | Tsuruta et al. |
| 9,796,218 | B2 * | 10/2017 | Kollias ............... B60C 15/0603 |
| 2002/0170641 | A1 * | 11/2002 | Rayman .................. B60C 11/02 152/167 |
| 2007/0034312 | A1 | 2/2007 | Matsumoto |
| 2008/0128066 | A1 | 6/2008 | Mitarai et al. |
| 2008/0163969 | A1 | 7/2008 | Maxwell |
| 2009/0107596 | A1 | 4/2009 | Palinkas et al. |
| 2009/0211677 | A1 | 8/2009 | Palinkas et al. |
| 2009/0211678 | A1 | 8/2009 | Palinkas et al. |
| 2012/0073719 | A1 * | 3/2012 | Kurosawa ............... B60C 13/02 152/523 |
| 2012/0085473 | A1 | 4/2012 | Matsou et al. |
| 2013/0076108 | A1 | 3/2013 | Kubota et al. |
| 2014/0041782 | A1 * | 2/2014 | Kudo ..................... B60C 13/02 152/523 |
| 2014/0144565 | A1 * | 5/2014 | Yukawa ............. B60C 15/0045 152/523 |
| 2015/0114538 | A1 | 4/2015 | Tsuruta et al. |
| 2015/0128690 | A1 * | 5/2015 | Park .................... B60C 11/0318 73/146 |

FOREIGN PATENT DOCUMENTS

| | | |
|---|---|---|
| JP | 1025892 | 11/1998 |
| JP | 1332663 | 6/2008 |
| JP | 2009-29380 | 2/2009 |
| JP | 1379459 | 2/2010 |
| JP | 5081476 | 11/2012 |
| KR | 10-2009-0117265 | 11/2009 |
| KR | 10-2010-0120000 | 11/2010 |

OTHER PUBLICATIONS

William Hughes, Schaum's Outline of Theory and Problems of Fluid Dynamics, 1967, McGraw-Hill, p. 75.*
Tsuruta (WO 2009/017165, machine translation, 2009).*
Josef Stelzer, EP 0232242, machine translation. (Year: 1987).*
Cardenas, Sandra N., Resolucion de notificacion del informe pericial (ley nueva), Jun. 24, 2015, 6 pages, Instituto Nacional de Propiedad Industrial, Santiago, Chile.
Office Action; Corresponding Design U.S. Appl. No. 29/487,856, filed Apr. 13, 2014; dated Jan. 4, 2016.
International Preliminary Report on Patentability and Written Opinion; Corresponding PCT Application No. PCT/US2015/025136; Authorized Officer Agnes Wittmann-Regis; Oct. 18, 2016.
International Search Report and Written Opinion; Corresponding PCT Application No. PCT/US2015/025136; Jul. 17, 2015.
Notification from JP Patent Office; Corresponding Japanese Design Application No. 2014-022821; Mar. 3, 2015.
Machine translation of JP2007-050854, filed Aug. 19, 2005, Sumitomo Rubber Ltd Inc.

* cited by examiner

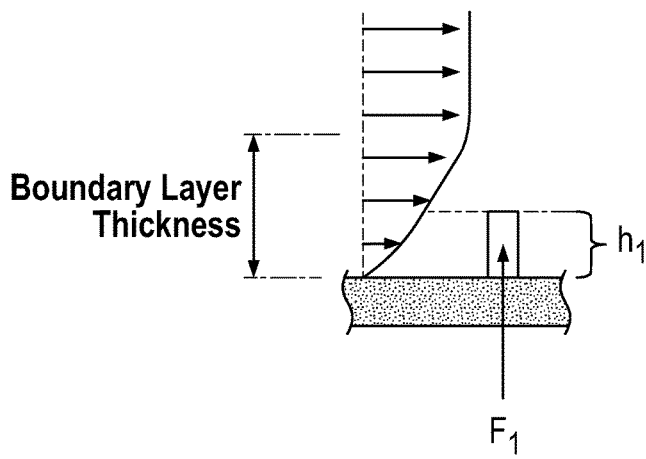
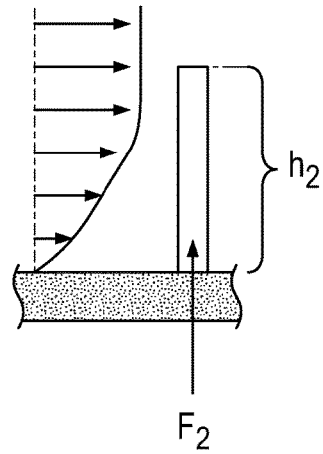
FIG. 6A          FIG. 6B
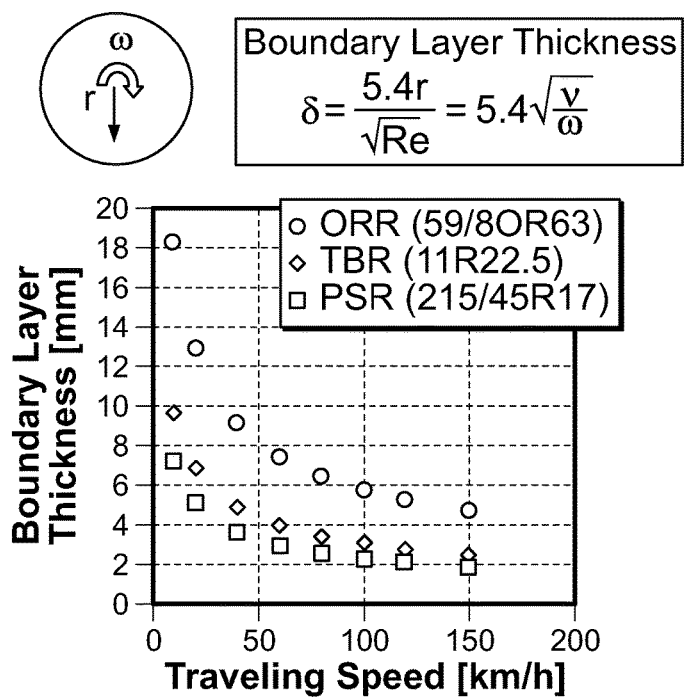
FIG. 7A

SIDEWALL COOLING FINS

CROSS REFERENCE TO RELATED APPLICATION

This application claims priority to U.S. Provisional Application No. 61/978,950 filed on Apr. 13, 2014, the disclosure of which is incorporated herein by reference in its entirety.

FIELD OF INVENTION

This disclosure relates to the field of tires, and more specifically to cooling structures for tires.

BACKGROUND

As a tire rotates, the tire tread rubber is compressed by the weight of the vehicle and then uncompressed by further rotation. This momentary loss of shape and size generates heat within the tread rubber. At some vehicle weights and speeds, the normal heat transfer mechanisms of conduction, convection and radiation are generally able to transfer heat out of the tread area sufficiently. However, at high rotational speeds (causing a high frequency of compression) or at heavy vehicular loads, the heat gain is much greater.

Cooling structures known in the art are bulky, reduce tire performance, are overly expensive, and are not optimized to cool the tire most efficiently.

SUMMARY

In one embodiment, a tire includes a sidewall having a first sidewall portion and a second sidewall portion, a first ring, and a second ring located on a second sidewall portion. The first and second rings each comprise at least one cooling fin and at least one recess next to the cooling fin. A first cooling has a first cooling fin height, equal to or greater than a first predetermined airflow boundary layer thickness at the location of the first cooling fin. A second cooling fin located in a second location has a second cooling fin height, equal to or greater than a second predetermined airflow boundary layer thickness at the second location. In this embodiment, the first cooling fin height is different than the second cooling fin height.

In another embodiment, a tire has a band of cooling fins located on a sidewall portion of the tire. The band of cooling fins comprises at least one protruding cooling fin and at least one recess located adjacent to the cooling fin, where the recess is recessed axially inwards relative to the cooling fin. The cooling fin has a height equal to or greater than an airflow boundary layer thickness at a predetermined location and angular velocity of the tire.

In yet another embodiment, a method for providing one or more cooling fins on a tire involves determining an airflow boundary layer thickness at a selected location of a tire by using the formula: $\delta = 5.4 r/\sqrt{Re} = 5.4\sqrt{(v/\omega)}$, where $\delta$ is the airflow boundary layer thickness, r is the distance along radius from an axle of the tire to the selected location, Re is the Reynolds number, v is the kinematic viscosity of air, and $\omega$ is a predetermined angular velocity of the tire at the selected location of the tire. The method further involves providing at least one cooling fin at the selected location of the tire, wherein the cooling fin has a height, and wherein the height is equal to or greater than the airflow boundary layer thickness $\delta$.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIGS. 6A-6B are schematic drawings showing fin height with respect to an airflow boundary layer thickness;

FIG. 7A is a graph detailing airflow boundary layer thickness with respect to traveling speed;

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road or ground under normal inflation and load.

While similar terms used in the following descriptions describe common tire components, it is understood that because the terms carry slightly different connotations, one of ordinary skill in the art would not consider any one of the following terms to be purely interchangeable with another term used to describe a common tire component.

Figure 1:
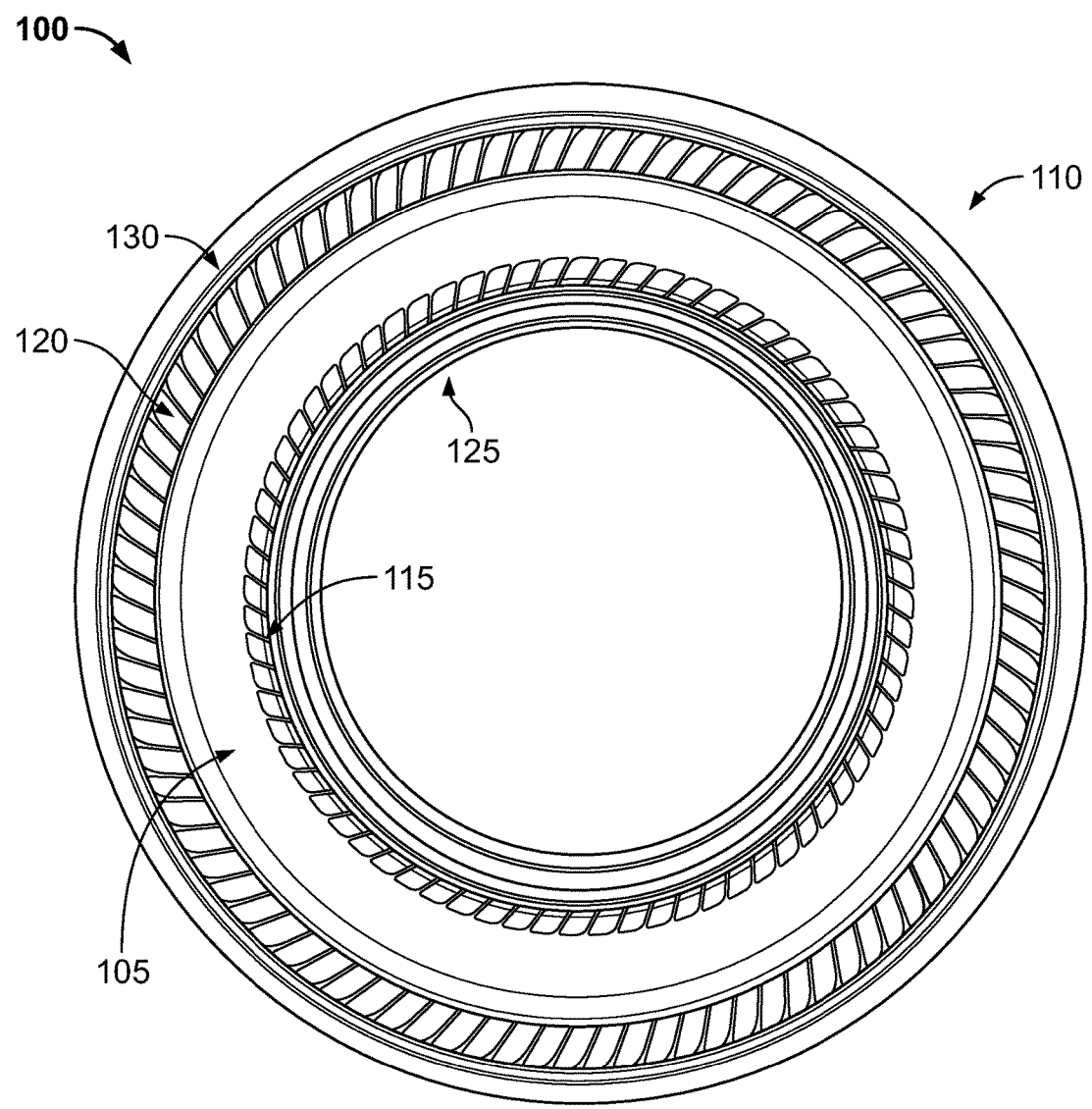
FIG. 1 is an side view of a first embodiment of a tire 100 having cooling fins.

FIG. 1 illustrates a side view of one embodiment of a tire 100. The tire 100 includes a sidewall 105 and a circumferential tread 110. In the illustrated embodiment, the tire 100 is a pneumatic tire configured for use on a light truck or passenger vehicle. In alternative embodiments, the tire may be configured for use on an agricultural vehicle or off-road vehicle. However, it should be understood that the tire may be configured for any use. Additionally, the tire may be a run-flat tire or a non-pneumatic tire.

In the illustrated embodiment, the tire 100 includes a lower band 115 and an upper band 120. The lower band 115 extends circumferentially around sidewall 105, near a bead portion 125 of the tire 100. The upper band 120 extends circumferentially around sidewall 105, near a shoulder 130 of tire 100.

In other embodiments, additional or fewer bands may be included on the tire 100, at any location on the tire 100. The location and number of bands may be selected based on the requirements of a particular application, such as cost, performance, temperature reduction, or for aesthetic reasons. It is anticipated that different applications will call for a different number of bands at various locations on the tire. The location and number of bands may thus be varied as desired.

Figure 2:
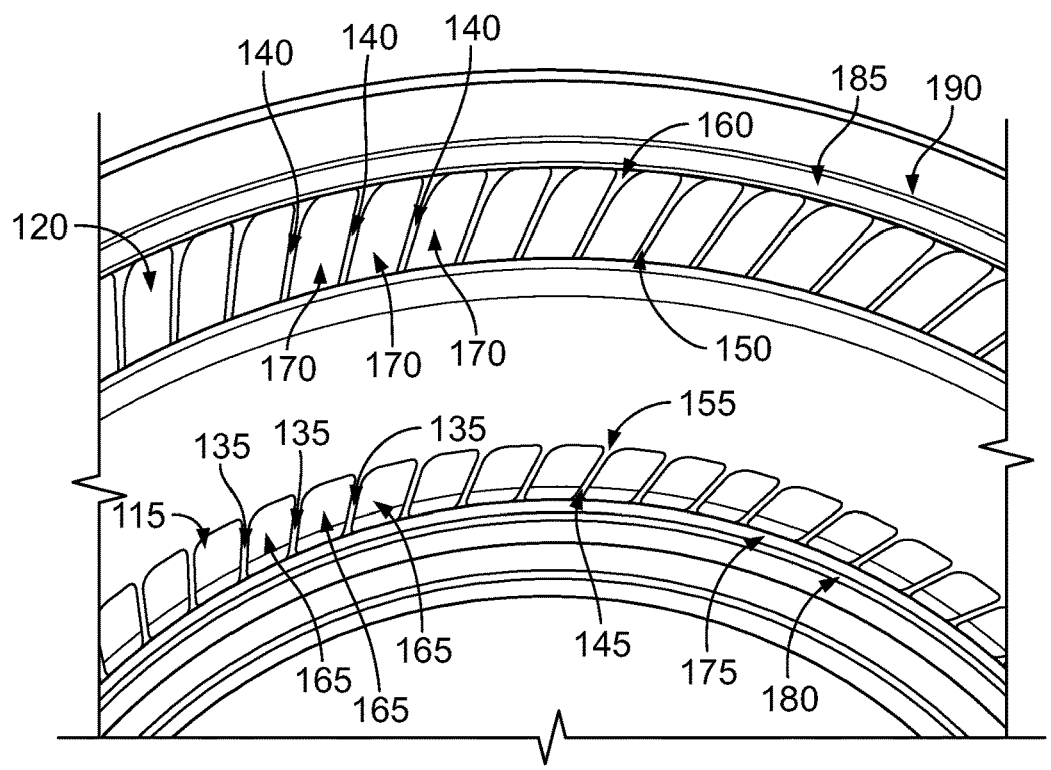
FIG. 2 is section view of the tire 100.

FIG. 2 illustrates a close up view of a section of tire 100. As can be seen in this view, the lower and upper bands 115, 120, each include a plurality of lower and upper cooling fins 135 and 140, respectively. The cooling fins 135, 140 protrude outwardly from tire sidewall region 105. In the illustrated embodiment, the cooling fins 140 of the upper band 120 are longer than the cooling fins 135 of lower band 115. In alternative embodiments, the cooling fins of the upper band may be shorter or the same length as the cooling fins of the lower band.

The cooling fins 135, 140 have uniform widths from lower ends 145, 150 towards upper ends 155, 160, and then have expanding widths at the upper ends 155, 160. Further, in the present embodiment the pitches of the cooling fins are uniformly angled with respect to a radial direction of tire 100. In the illustrated embodiment, the cooling fins 135, 140 are each disposed at an angle of approximately 27° with respect to the radius of the tire. In alternative embodiments (not shown), the cooling fins are each disposed at an angle between −45 and 45°. In another alternative embodiment (not shown), the lower cooling fins are disposed at a first angle, and the upper fins are disposed at a second angle different from the first angle. In yet another alternative embodiment not shown), the lower cooling fins are disposed at multiple angles and the upper cooling fins are disposed at multiple angles.

It should be understood that the positioning, shape, pitch, and number of cooling fins can be varied. For example, in other embodiments cooling fins may be flush or recessed with a tire sidewall region, may be located on a different portion of the tire, may have different non-uniform pitches with respect to a radial direction of the tire, may have different shapes, and may vary in number.

As also seen in FIG. 2, recesses 165 are disposed between each of the cooling fins 135 in the lower band 115. Similarly, recesses 170 are disposed between each of the cooling fins 140 in the upper band 120. The recesses 165, 170 are recessed into sidewall 105 relative to the flat portion of the sidewall 105 disposed between the lower band 115 and the upper band 120. In an alternative embodiment (not shown), the recesses are in the same plane as the flat portion of the sidewall disposed between the lower band and the upper band. In another alternative embodiment (not shown), the recesses protrude outward from the sidewall, but are still recessed relative to the cooling fins.

A height of cooling fins 135, 140 measured from an outer surface of each cooling fin, to a base portion of each cooling fin located in recesses 165, 170. In one embodiment, the height of cooling fins 135 in the lower band 115 is equal to, the height of the cooling fins 140 in the upper band 120. However, in alternative embodiments, the height of the cooling fins in the lower band may be greater than or less than the height of the cooling fins in the upper band.

With continued reference to FIG. 2, a lower circumferential groove 175 and a lower circumferential rib 180 are disposed below the lower band 115. Additionally, an upper circumferential groove 185 and an upper circumferential rib 190 are disposed above the upper band 120.

Figure 3:
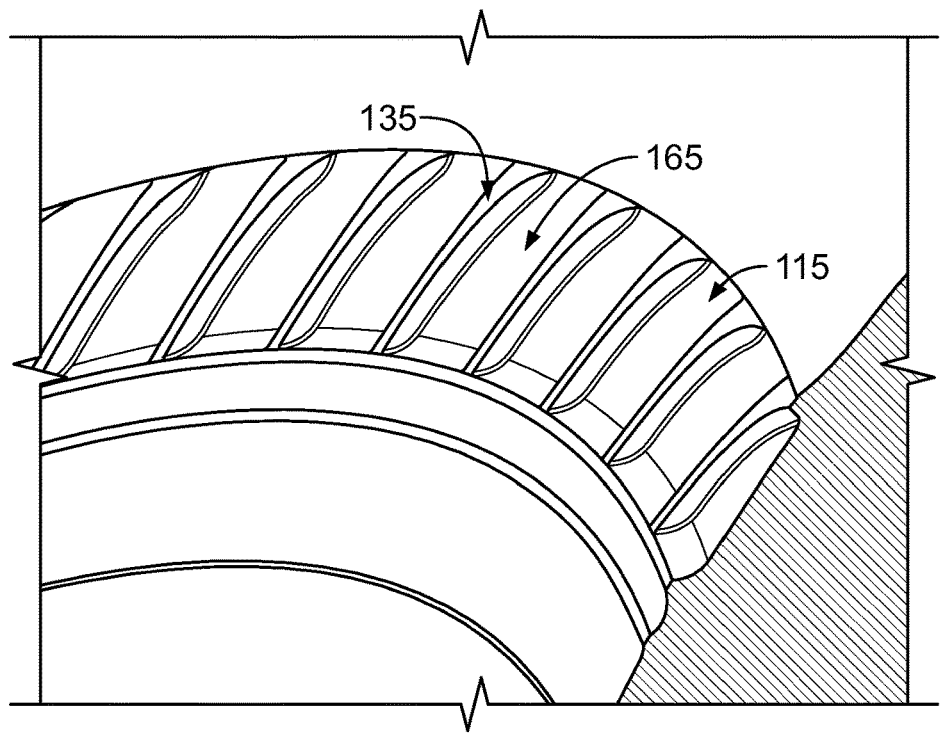
FIG. 3 is a perspective section view of the tire 100.

FIG. 3 illustrates an alternate view of the first embodiment, focusing on the lower band 115. In FIG. 3, the height of the cooling fins 135 with respect to the recesses 165 can be seen.

Figure 4B:
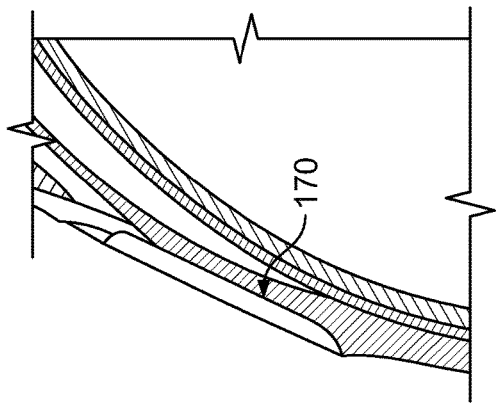
FIG. 4B is a close-up portion of the cross section of the tire 100 shown in FIG. 4A.
Figure 4C:
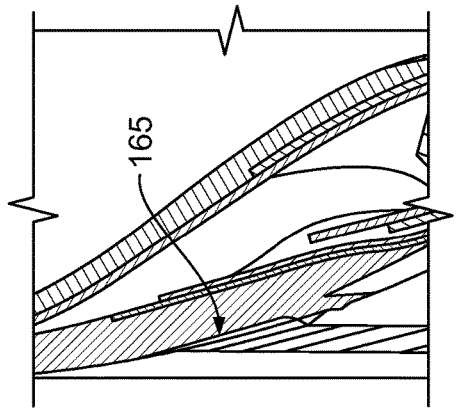
FIG. 4C is another close-up portion of the cross section of the tire 100 shown in FIG. 4A.
Figure 4A:
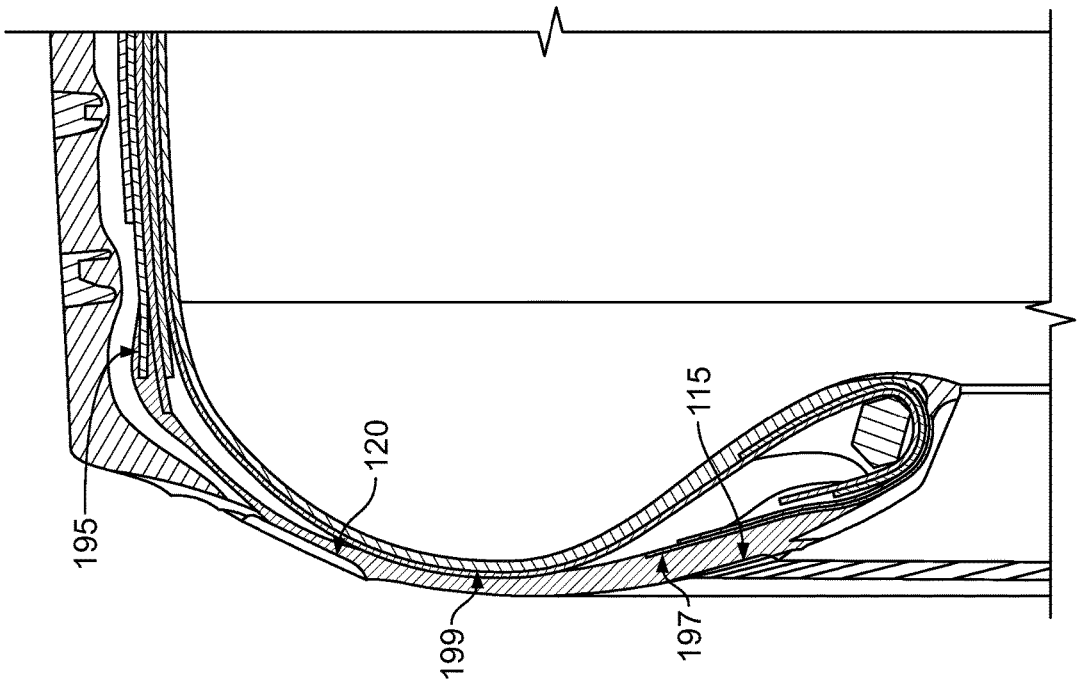
FIG. 4A is a cross section of the tire 100.

FIGS. 4A-C show different cross sectional views of the first embodiment of tire 100. As seen in FIG. 4A, the upper band 120 is located near a shoulder region 130 of the tire 100, below a belt 195 of the tire. The lower band 115 is located near a bead portion 126 of the tire 100. More specifically, the lower band 115 is located near a turn up portion 197 of body plies 199. FIG. 4B and FIG. 4C depict close-up views of the upper band 120 and lower band 115, respectively, from the same perspective as in FIG. 4A. As can be seen in FIG. 4B and FIG. 4C, recesses 165 and 170 extend into the sidewall region 101 of tire 100 in this embodiment.

In the illustrated embodiment, the upper and lower bands 120, 115 are positioned near the edges of the belts 195 and turn up portions 197 of the body ply 199 of tire 100. This positioning allows tier the regions containing the belt edges and body ply turn up portions to receive the cooling benefit of the fins.

Figure 5:
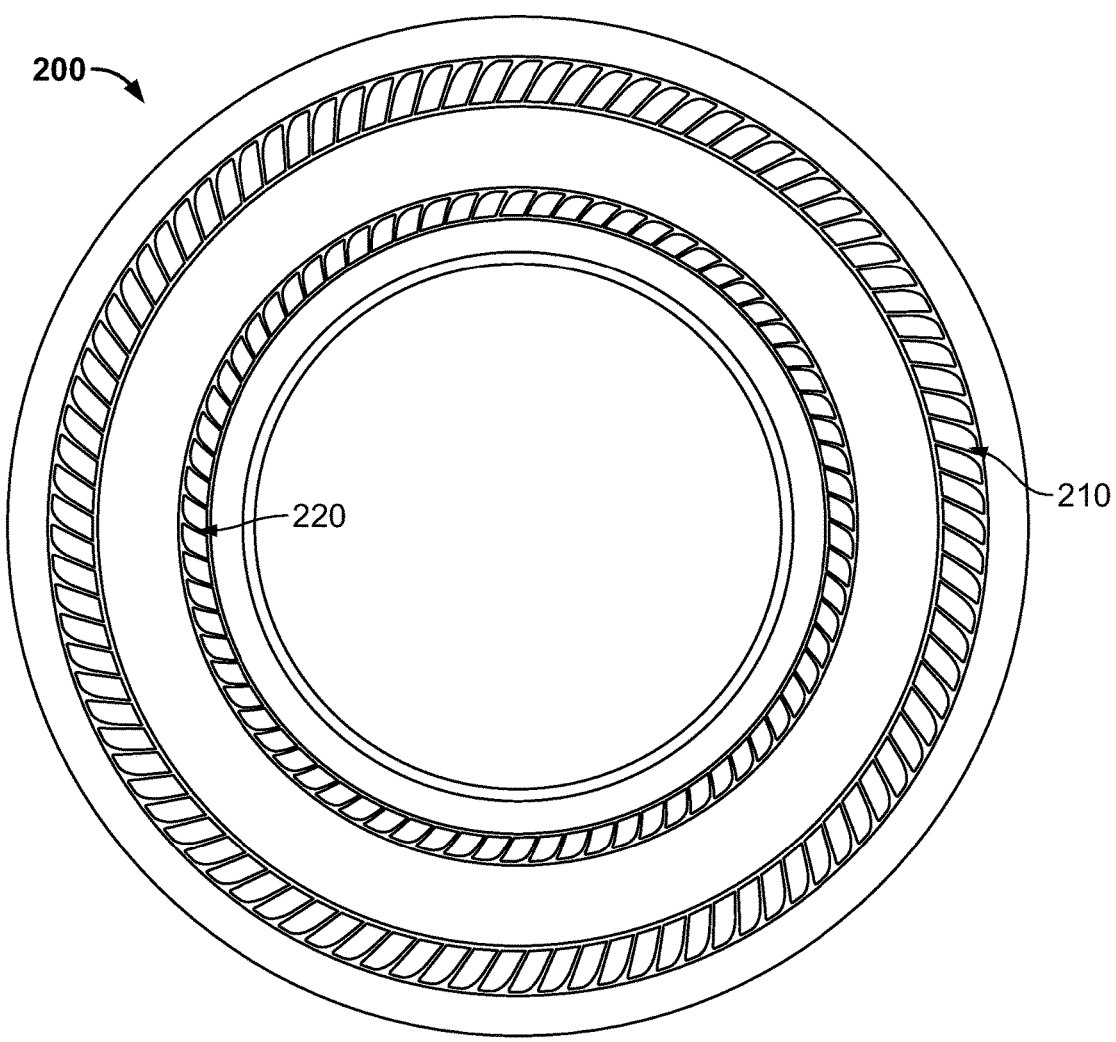
FIG. 5 is a side view of an alternative embodiment of a tire having cooling fins.

FIG. 5 is a side view of an alternative embodiment of a tire 200 having an upper band 210 of cooling fins and a lower band 220 of cooling fins. The tire 200 is substantially the same as the tire 100 illustrated in FIGS. 1-4, except the lower circumferential groove, lower rib, upper circumferential groove, and upper rib are omitted.

FIGS. 6A and 6B illustrate exemplary cooling tins in relation to an airflow adjacent to tire 100 when in motion. In FIG. 6A, the first exemplary cooling fin $F_1$ has a height $h_1$ that is less than the airflow boundary layer thickness $\delta$. In FIG. 6B, the second exemplary cooling in $F_2$ has a height $h_2$ that is approximately equal to the airflow boundary layer thickness $\delta$.

Airflow boundary layer thickness $\delta$ is related to the angular velocity of the tire, and can be determined by using the following equation:

$$\delta = \frac{5.4r}{\sqrt{Re}} = 5.4\sqrt{\frac{v}{\omega}}$$

where:
  $\delta$ the airflow boundary layer thickness;
  r is the radius to the location of interest of the airflow boundary layer thickness;
  Re is the Reynolds number;
  v is the kinematic viscosity of air;
  $\omega$ is the angular velocity.

When the cooling fin height h is selected to be approximately equal to the airflow boundary layer thickness $\delta$ (such as shown in FIG. 6A), the cooling fins break up the laminar flow boundary layer and introduce turbulent airflow to the surface of the tire. This increases the amount of convective heat transfer between the tire and the surrounding air, helping to lower the temperature of the tire at these points. Other advantages of turbulent airflow on the surface of a tire will be apparent to those of ordinary skill in the art.

By contrast, when the cooling fin height h is less than the airflow boundary layer thickness (such as shown in FIG.

6B), the cooling fins do not break up the laminar flow boundary layer. In such an embodiment, no turbulent airflow is introduced to the surface of the tire.

FIG. 7A is a chart that depicts the relationship between airflow boundary layer thickness δ and traveling speed, in kilometers per hour. Testing was done on tires of different sizes, including an off road radial tires ("ORR"), a truck and bus radial tires ("TBR"), and passenger radial tires ("PSR"). As can be seen from FIG. 7A, in all cases, the airflow boundary layer thickness δ decreased significantly as traveling speed increased from 0 to 50 kilometers hour. The airflow boundary layer thickness δ continued to decrease, but less significantly, as traveling speed increased from 50 to 150 kilometers per hour.

Figure 7B:
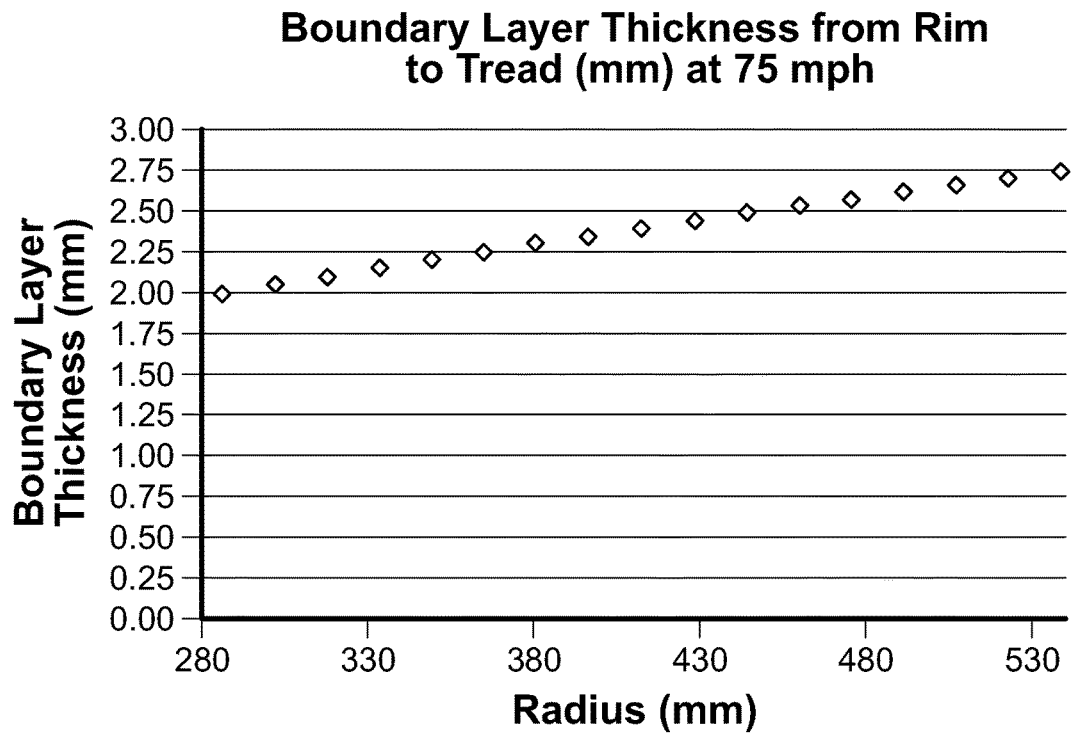
FIG. 7B is a graph depicting airflow boundary layer thickness with respect to rim to tread radii at 75 mph.

FIG. 7B is a chart that depicts the effect of change of radius on the airflow boundary layer thickness δ at a constant speed. As can be seen from this chart, at a speed of 75 miles per hour, the airflow boundary layer thickness increases along the sidewall moving outward from the bead to the tread. In other words, a point on the sidewall near the bead will have a lower airflow boundary layer thickness than a point on the sidewall near the tread.

Figure 7C:
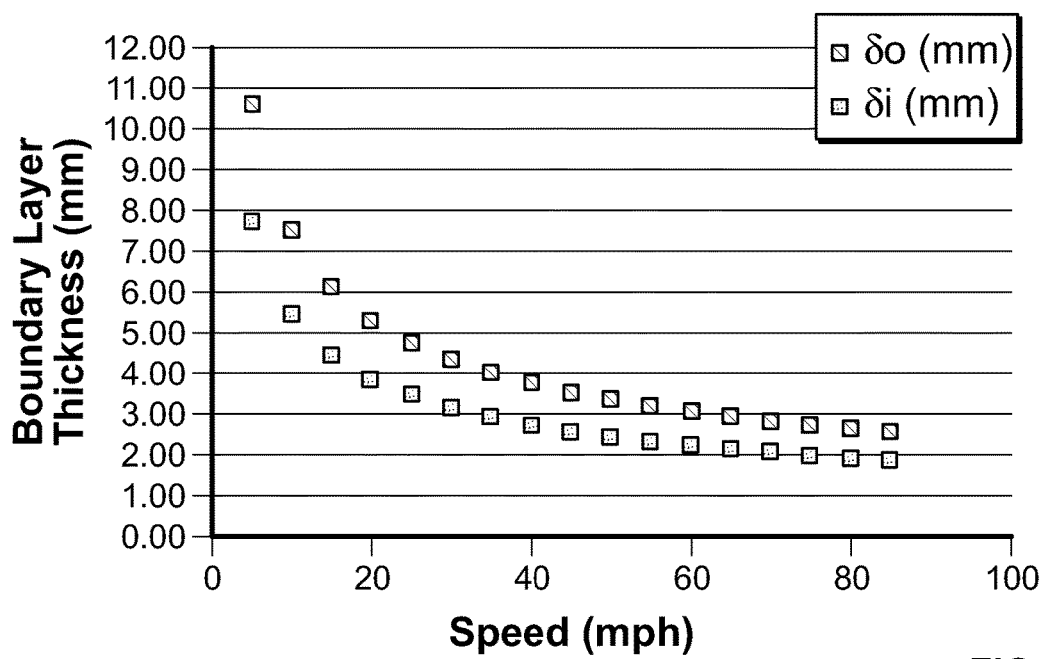
FIG. 7C is a graph depicting airflow boundary layer thickness with respect to speed.

FIG. 7C is a chart that depicts the relationship between airflow boundary layer thickness δ and speed in miles per hour. $\delta_o$ represents the airflow boundary layer thickness in an outer band region of the sidewall, and $\delta_i$ represents the airflow boundary layer thickness in an inner band region of the sidewall.

Based on these measurements, the heights of the cooling fins in the inner band and outer band can be selected to approximate the boundary layer thickness of a given tire for a given speed.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed, 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire comprising:
    a sidewall having a first sidewall portion and a second sidewall portion;
    a first ring located on the first sidewall portion,
    wherein the first ring includes a first plurality of protruding cooling fins,
    wherein at least one first recess is located adjacent to each of the first plurality of protruding cooling fins,
    wherein the at least one first recess is recessed axially inwardly relative to a sidewall surface of the tire,
    wherein each of the first plurality of protruding cooling fins has a first cooling fin height, such that the first plurality of protruding cooling fins are all of equal height, and
    wherein the first cooling fin height is equal to or greater than a first predetermined airflow boundary layer thickness at the first sidewall portion of the tire;
    a second ring located on a second sidewall portion, spaced from the first ring, such that the first ring does not touch the second ring,
    wherein the second ring includes a second plurality of protruding cooling fins,
    wherein at least one second recess is located adjacent to each of the second plurality of protruding cooling fins, the at least one second recess being separate and distinct from the at least one first recess
    wherein the at least one second recess is recessed axially inwardly relative to a sidewall surface of the tire,
    wherein each of the second plurality of protruding cooling fins has a second cooling fin height, such that the second plurality of protruding cooling fins are all of equal height,
    wherein the second cooling fin height is equal to or greater than a second predetermined airflow boundary layer thickness at the second sidewall portion of the tire,
    wherein the first cooling fin height is different than the second cooling fin height, and
    wherein the first ring is located radially outward from the second ring.

2. The tire of claim 1, where the first predetermined airflow boundary layer thicknesses at the first sidewall portion and the second predetermined airflow boundary layer thickness at the second sidewall portion correspond to the formula:

$$\delta = 5.4r/\sqrt{Re} = 5.4\sqrt{(v/\omega)},$$

where δ is the airflow boundary layer thickness,
r is the distance from an axle of the tire to either the first or second sidewall portion of the tire along a radial axis,
Re is the Reynolds number,
ω is the kinematic viscosity of air, and
ω is a predetermined angular velocity at either the first sidewall portion of the tire or the second sidewall portion of the tire.

3. The tire of claim 1, wherein each of the first plurality of protruding cooling fins on the first ring has a radially inner first width, and wherein each of the first plurality of protruding cooling fins on the first ring has a radially outer second width, and wherein the radially inner first width is less than the radially outer second width.

4. The tire of claim 1, wherein the first plurality of protruding cooling fins on the first ring has a first pitch defined in a tire circumferential direction, and wherein the second plurality of protruding cooling fins on the second ring has a second pitch defined in a tire circumferential direction, and wherein the first pitch is different from the second pitch.

5. The tire of claim 1, wherein each of the first and second recesses is recessed axially inwardly relative to each respective adjacent cooling fin.

6. The tire of claim 1, wherein the first ring is located adjacent an edge of a belt in the tire, and wherein the second ring is located near an edge of a body ply in the tire.

7. A tire comprising:
a first band of cooling fins located on a sidewall portion of the tire, the first band of cooling fins being located adjacent to an edge of a belt of the tire,
wherein the first band of cooling fins includes a first plurality of cooling fins and a first plurality of recesses, wherein each of the first plurality of recesses is located adjacent to one of the first plurality of cooling fins,
wherein the first plurality of cooling fins is flush with the sidewall portion of the tire,
wherein at least a portion of each of the first plurality of recesses is recessed axially inwards relative to the plurality of cooling fins,
wherein the first plurality of cooling fins are all of equal height, and
wherein the height of the first plurality of cooling fins is equal to or greater than an airflow boundary layer thickness at a predetermined location and angular velocity of the tire,
a second band of cooling fins located on a sidewall portion of the tire spaced from the first band, such that the first band does not touch the second band, the second band of cooling fins being located adjacent to a turn up portion of the tire,
wherein the second band of cooling fins includes a second plurality of cooling fins and a second plurality of recesses, the second plurality of recesses being separate and distinct from the first plurality of recesses, and wherein each of the second plurality of recesses is located adjacent to one of the second plurality of cooling fins,
wherein the second plurality of cooling fins is flush with the sidewall portion of the tire,
wherein at least a portion of each of the second plurality of recesses is recessed axially inwards relative to the plurality of cooling fins, and
wherein the second plurality of cooling fins are all of equal height, and
wherein the height of the second plurality of cooling fins is equal to or greater than an airflow boundary layer thickness at a predetermined location and angular velocity of the tire.

8. The tire of claim 7, where the airflow boundary layer thickness of the first plurality of cooling fins and the second plurality of cooling fins corresponds to the formula:

$$\delta = 5.4r/Re = 5.4\sqrt{(v/\omega)},$$

where $\delta$ is the airflow boundary layer thickness,
r is the distance from an axle of the tire to the sidewall portion of the tire along a radial axis,
Re is the Reynolds number,
v is the kinematic viscosity of air, and
$\omega$ is a predetermined angular velocity of the tire at the sidewall portion of the tire.

9. The tire of claim 7, wherein each of the first plurality of cooling fins and second plurality of cooling fins has a variable width along its length.

10. The tire of claim 7, wherein the first plurality of cooling fins has a non-uniform pitch as compared to the second plurality of cooling fins, the non-uniform pitch being defined in the tire circumferential direction.

11. The tire of claim 7, wherein each of the first plurality of recesses and the second plurality of recesses is recessed axially inwards relative to the sidewall portion of the tire.

12. The tire of claim 7, wherein the height of the second plurality of cooling fins is equal to or greater than an airflow boundary layer thickness at a predetermined location and angular velocity of the tire.

* * * * *